US012592991B1

(12) United States Patent (10) Patent No.: US 12,592,991 B1
Torchiano et al. (45) Date of Patent: Mar. 31, 2026

(54) FACILITIES MANAGEMENT TECHNIQUES HAVING CENTRALIZED CONTROL OVER COMMUNICATIONS AND ACTIONS FROM DIVERSE APPLICATIONS

(71) Applicant: SPRYGG INC., Park Ridge, NJ (US)

(72) Inventors: David M. Torchiano, Astoria, NY (US); Joshua M. Arak, Park Ridge, NJ (US)

( * ) Notice: Subject to any disclaimer, the term of this patent is extended or adjusted under 35 U.S.C. 154(b) by 0 days.

(21) Appl. No.: 19/021,055

(22) Filed: Jan. 14, 2025

(51) Int. Cl.
*H04M 3/42* (2006.01)
*H04L 51/046* (2022.01)
*H04M 3/53* (2006.01)
*G06F 40/35* (2020.01)

(52) U.S. Cl.
CPC ...... *H04M 3/42221* (2013.01); *H04L 51/046* (2013.01); *H04M 3/5307* (2013.01); *G06F 40/35* (2020.01); *H04M 2201/405* (2013.01); *H04M 2201/42* (2013.01)

(58) Field of Classification Search
CPC .......... H04M 3/42221; H04M 3/5307; H04M 2201/405; H04M 2201/42; H04L 51/046; G06F 40/35
USPC ....................................................... 370/259
See application file for complete search history.

(56) References Cited

U.S. PATENT DOCUMENTS

| | | | | | |
|---|---|---|---|---|---|
| 11,232,476 | B1 * | 1/2022 | Kugler | ................. | H04M 3/4878 |
| 11,240,278 | B1 * | 2/2022 | Wang | .................. | H04L 65/4053 |

| | | | | | |
|---|---|---|---|---|---|
| 11,616,752 | B1 * | 3/2023 | Seok | ........................ | H04L 51/56 |
| | | | | | 709/206 |
| 11,727,205 | B1 * | 8/2023 | Shevchenko | .......... | G06V 40/20 |
| | | | | | 715/200 |
| 2016/0125371 | A1 * | 5/2016 | Grassadonia | ........ | G06Q 20/405 |
| | | | | | 705/44 |
| 2021/0342785 | A1 * | 11/2021 | Mann | ................ | G06Q 10/06316 |
| 2023/0079775 | A1 * | 3/2023 | Ruparel | .................. | G10L 17/22 |
| | | | | | 704/235 |
| 2023/0091485 | A1 * | 3/2023 | Hayashi | .................. | G06N 5/022 |
| | | | | | 705/7.28 |
| 2023/0274095 | A1 * | 8/2023 | Kelkar | .................. | G06F 40/247 |
| | | | | | 704/9 |
| 2023/0351427 | A1 * | 11/2023 | Doumar | ................ | G06K 7/1417 |
| 2023/0410801 | A1 * | 12/2023 | Mishra | .................... | H04L 51/02 |
| 2024/0177084 | A1 * | 5/2024 | Liu | ................ | G06Q 10/063112 |
| 2024/0232765 | A1 * | 7/2024 | Austraat | ................. | G06F 40/30 |

(Continued)

*Primary Examiner* — Anthony Mejia
(74) *Attorney, Agent, or Firm* — Beckman Law P.C.; Christopher Beckman

(57) ABSTRACT

A new form of facilities management system is provided, including a control system that creates, assigns and manages unique, dedicated communications channels for users of the system based on subject matter mined from initial communications, masks them, and mediates further communications through the masked communications channel(s). In some embodiments AI modules are included in the system which generate AI agents according to such subject matter. AI agents then execute freeform message commands from users, based on a unique syntax including auxiliary identifiers. In some embodiments, a specialized GUI is provided, which includes at least one other, consolidated communications channel, linked to multiple masked communications channels, and including and creating communications from the unique, dedicated communications channel(s) and the pre-existing communications channel(s).

20 Claims, 6 Drawing Sheets

(56) References Cited

U.S. PATENT DOCUMENTS

2024/0364763 A1 * 10/2024 Wang ..................... G06F 16/176
2024/0414108 A1 * 12/2024 Sun ....................... H04L 51/216

* cited by examiner

FACILITIES MANAGEMENT TECHNIQUES HAVING CENTRALIZED CONTROL OVER COMMUNICATIONS AND ACTIONS FROM DIVERSE APPLICATIONS

INTELLECTUAL PROPERTY NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Unless otherwise stated, all trademarks and trade dress disclosed in this patent document and other distinctive names, emblems, and designs associated with product or service descriptions, are subject to trademark rights. The trademark and trade dress owner also reserves all trademark rights whatsoever.

FIELD OF THE INVENTION

The present disclosures relate to new systems, devices and methods for controlling diverse forms of communications, and actions related thereto, in the field of facilities management (or "FM").

BACKGROUND

Formal private ownership and management of real estate dates at least to the early recorded civilization of Sumer, in Mesopotamia, over 2,000 years BCE. Facilities management ("FM"), such as early air conditioning system maintenance and building repairs, where carried out in Sumer, and leases and other real estate contracts were recorded in written language on clay tablets. And commercial real estate leases and management systems, by business tenants, date at least to Ancient Rome.

From the beginning, facilities management was a high-stakes, resource-intensive human activity, matched in importance by its logistical challenges. Modern day facilities managers have to control a wide range of maintenance, technology, labor, supply chain and administrative functions for a commercial real estate activity, each having complex legal and business implications. Especially in larger commercial real estate ventures, many different private facilities vendors may be hired by a facilities manager to service a project.

Different vendors have their own dedicated contact information and modes of communication, for a wide variety of types of communications. Written correspondence hand-delivered to traditional physical addresses is used less predominantly today, but still serves as an important mode of communication, particularly for formal matters. Telephone numbers, including those for both wired "land lines" and cellular telephones, remain in heavy use as of this application filing. However, text messaging over cellular telephone networks is also used frequently as a mode of communication in facilities management.

In addition, many facilities vendors use computer hardware and software applications for communication and managing their services. A vendor may even develop their own, dedicated desktop and/or smartphone application ("Vendor Application"), and may go so far as to demand that all client/customer agents, including facilities managers for commercial real estate, download and log in to their unique Vendor Application as a condition for obtaining and monitoring logistics for goods and services provided by that vendor.

In addition, some vendors may use third-party provided applications for communications and project management purposes. However, there is no general consensus in the facilities management industry as to which third-party application is best, and, potentially complicating matters further, new applications may later emerge, after a third-party provided application is selected. Many applications include e-mail forwarding and push notifications tools for communications as a feature.

Generally, communications across so many different channels and platforms makes facilities management difficult. Property Managers (or "PMs") of the FM provider often physically take notes during various communications, such as calls, emails and SMS/MMS messages, and may store them in different notes folders, repositories and/or systems. Because PMs are typically handling multiple work orders within a time period, they may only capture the data that is necessary at a given moment, and then have difficulty retrieving critical data that commercial tenants want in order to understand how their FM tasks are being completed, and how their budgets are being spent, among other things.

Software applications used by businesses sometimes use phone numbers as a communication address and as an identifier of a commercial vendors' customer. For example, RESY, by Resy Network, Inc., uses phone numbers both as identifiers of vendors' customers, and for communications with those same customers. Some such applications may generate phone numbers for use within such an application. For example, the application Fireflies provides phone numbers which customers may use to record conversations, by having the additional number "join" a call. However, the use of additional numbers may create privacy concerns, and may more greatly complicate businesses' communication footprint in some respects, even as they provide an important service to that business.

There remains a long-felt need for improved communications management systems in the real estate and facilities management industries.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of this application's inventor's own discoveries and work and work results.

SUMMARY OF THE INVENTION

New systems, devices and methods are provided for controlling diverse forms of communications, and actions related thereto, in the field of facilities management ("FM").

In some embodiments, a new form of facilities management system (an "FM system") is provided, which includes a control system with specialized computer hardware and software that creates, assigns and manages at least one unique, dedicated communications channel(s) for a user of the system. For example, in some embodiments, such a communications channel is created, assigned and managed for each facilities manager user creating an account on the FM system. As another example, in some embodiments, such a communications channel is created, assigned and managed for each vendor user of the FM system. As yet another example, in some embodiments, such a communications channel is created, assigned and managed for each FM client user of the FM system. And, in some embodiments, such a communications channel is created for any or all of the above-mentioned users.

In some embodiments, such a unique, dedicated communications channel includes a unique, dedicated address, such as a telephone number. And, in some such embodiments, such a unique, dedicated address is an FM system generated telephone number. As another example, in some embodiments, such a unique, dedicated address is an FM system generated e-mail address (e.g., incorporating a top-level Internet domain owned by the facilities manager). In some embodiments, such a unique address, telephone number and/or communications channel is "dedicated" in the sense that the FM system does not use that address, telephone number and/or communications channel for other user(s) at all, or, in some embodiments, at the same time and/or in the same way. In other words, in some embodiments, such a system-generated, unique address, telephone number and/or communications channel is assigned only to one client. However, in some embodiments, such a system-generated, unique address, telephone number and/or communications channel is assigned to a unique project, which may be assigned to a set of facilities managers, project managers, vendors, clients and/or other stakeholders. And, in some such embodiments, the FM system manages and records some or all communications related to a project (e.g., of a wide variety of communications types, ranging from e-mail to voice and text) by directing such communications through such a system-generated, unique address, telephone number and/or communications channel, as will be discussed further below.

In some embodiments, such a system-generated, unique address, telephone number and/or communications channel may be "masked," as it is used to mediate communications for such user(s), meaning that at least some users of the FM system may make, receive and manage them, without the FM system indicating, publishing or revealing the identity of the address, telephone number and/or communications channel. Thus, in such embodiments, at least some user(s) remain unaware that such communications are being directed through such a system-generated, unique address, telephone number and/or communications channel (a.k.a. are being "mediated through" such a system-generated, unique address, telephone number and/or communications channel). Instead, in some such embodiments, at least some user(s) may use their account(s) on the FM system to communicate regarding a project, and view and manage any such communications through the FM system application through graphical user interface ("GUI") tools, while the system-generated, unique address, telephone number and/or communications channel remain so masked. However, it should be noted that, in some embodiments, although the unique address, telephone number and/or communications channel remains so masked, if it is known by one or more user(s), it is possible for such one or more user(s) to send communications directly to that unique address, telephone number and/or communications channel without using GUI tools of the FM system, using conventional communications means for such an address, telephone number and/or communications channel. And, if so, such directly sent communications may be managed, recorded and used similarly to other FM system mediated communications, discussed in this application.

In some embodiments, the FM system links a pre-existing communications address (e.g., a phone number), owned by a user, to such a system-generated, unique address, telephone number and/or communications channel, such that, when a communication is sent to such a system-generated, unique address, telephone number and/or communications channel, the FM System will forward at least part of the communication to the pre-existing communications address. Thus, in some embodiments, a specialized GUI is provided, which represents and includes at least one other, consolidated communications channel, linked to one or more masked communications channel(s) and/or one or more pre-existing communications channel(s), which consolidated communications channel includes, transmits and creates communications from the unique, dedicated communications channel(s) and the pre-existing communications channel(s).

And, in some embodiments, while mediating communications through such a system-generated, unique address, telephone number and/or communications channel, the FM System will ingest and transcribe the communications (e.g., via Application Programming Interface ("API") calls), and take further actions based thereon, as will be discussed in greater detail below.

As mentioned above, in some embodiments, the FM system manages and records some or all communications related to a project by directing such communications through such a system-generated, unique address, telephone number and/or communications channel. And, in some embodiments, as discussed above, users of the FM system may be unaware that such communications are being directed through such a system-generated, unique address, telephone number and/or communications channel. In some embodiments, users may access the FM system and software thereof to communicate regarding the project in any number of different communications formats. For example, in some embodiments, users may manipulate GUI tools of the FM system to manage and engage in voice messaging, e-mail, live voice calls, video meetings, text messaging, data transmissions, and/or a virtual bulletin board, and view and manage any and all such communications through the FM system application through such GUI tools, while the communications channel and/or telephone number remain masked, as discussed above.

And, conversely, in some embodiments, users may carry out actions on the FM system based on a wide variety of communications mediated by the masked communications channel and/or telephone number, for example, over SMS, voice messages, and/or e-mail (which communications may be referred to in this application as "message commands"). In some embodiments, such a message command may be made in any format, or even using natural language (which may be referred to as "freeform message commands" in this application). However, in some embodiments, at least some syntax or other formal prerequisites must be carried out within message commands for the FM system to take such actions—e.g., in some such embodiments, a user must include details of a record and/or object stored on the FM system (e.g., a work order, location, client name, or other unique identifier) as a prerequisite for the FM system to perform such actions with respect to such a record and/or object (e.g., updating a vendor work order for an FM project).

In addition, in some embodiments, any new user contacting another user of the FM system through such a system-generated, unique address, telephone number and/or communications channel may be instantaneously assigned another new unique address, telephone number and/or communications channel generated by the FM System, which, in some embodiments, may be masked, or, conversely, in some embodiments, used to mask the new user's pre-existing telephone number or other identifier used in contacting the FM system. In some such embodiments, the FM system not only generates, but also instantaneously publishes such a telephone number and/or other identifier of the new system-generated, unique address, telephone number and/or communications channel to other users (e.g., to the other user contacted by the new user).

In some embodiments, the control system of the FM system uses a set of artificial intelligence ("AI") modules and application programming interfaces (APIs) to automatically build data repositories based on communications and project information. For example, to on-board and complete FM services, commercial landlords often require verifying documentation, such as a certificate of insurance ("COI"), proof of bond, license, and proof of task completion, among other requirements, as required for service vendors to complete the necessary work. In some embodiments, an FM system addresses this problem by organizing verifying information regarding vendors in a central data repository for that subject matter, including vendor-specific information derived from the communications channel. In such a repository, PMs can quickly access a vendor's COI, proof of bond, license(s), proof of task completion, and other documentation.

In some embodiments, the FM system also addresses the technical problem of keeping track of communications related to specific vendors, real estate properties, facilities, FM projects and work orders. By ingesting voice calls, SMS/MMS texts, instant messages, emails, and other forms of communications over such a system-generated, unique address, telephone number and/or communications channel, and labeling communications, and aspects of communications, via AI modules (discussed further below) a single trail of communications, requirements, decisions and actions that were made for specific vendors, real estate properties, facilities, FM projects and work orders is created, for example, in a central data repository within the FM system.

In some embodiments, when a call, SMS, or e-mail or other communication is made to, or through, the system-generated, unique address, telephone number and/or communications channel, the FM system stores, reads and transcribes the communication (e.g., telephone conversation) via a transcription sub-module. An AI module (e.g., a machine learning module) may then summarize, sort by subject matter, and store derived data from the transcripts in such central data repositories.

As discussed above, the FM system includes new forms of AI modules, in some embodiments, to build and apply analytical algorithms based on data of various types communicated through the telephone number and/or communications channel. In some embodiments, a new form of neural network and/or large language model ("LLM") is implemented to create and organize data repositories such as those discussed above (e.g., by subject matter, vendor, real estate property, facility, FM project and work order). For example, in some embodiments, such an AI module generates an algorithm for labeling data present in communications over the communications channel. In some such embodiments, storing of such data within such repositories is based on such labeling of data. And, in some embodiments, such an algorithm is generated and/or altered based on data present in work orders and/or standardized FM documents. And, in some embodiments, such algorithms of the AI modules may serve as a basis for facilities management and other project management actions. For example, in some such embodiments, such AI modules automate workflow for FM maintenance and other FM issues. In some embodiments, data related to a work order or other project component may be tracked and managed through various milestones of the workflow with limited to no human intervention. Such AI modules may themselves take next project management steps based on data in such central data repositories. And, generally speaking, in some embodiments, such AI modules may act as one or more virtual agent(s), including a chatbot sub-module, allowing the FM system to interact with users in a humanistic manner and more generally undertake additional project management steps. For example, the AI modules may respond with natural language (e.g., through communications channel(s) assigned to user(s) and/or project(s), via text or voice, to stakeholders assigned to a work order if additional information is required. In some embodiments, an additional communications channel may be assigned to such a virtual agent (or, in some such embodiments, an instance of such a virtual agent) such that the virtual agent may interact with users of the FM system in a way similar to those users of the FM system.

In some embodiments, the FM system includes a hand-held device (such as a smartphone with a mobile application, in accordance with aspects of the inventions set forth herein) comprising or comprised in the control system of the FM system. And the smartphone and/or FM system may communicate with other systems, such as an external, off-premises FM system and/or an enterprise resource planning system ("ERP"), in various embodiments. Thus, in some embodiments the FM system may communicate with, coordinate and control external systems, having additional control systems and components, as set forth in the present application, in some such embodiments, to manage facilities management being controlled by such external systems.

In some embodiments, the inventions set forth in this Application are implemented as a comprehensive, all-inclusive control system, managing the entire facilities management, maintenance and/or other related processes as an ERP and/or administrative system. However, aspects of the invention are not limited to the facilities management and resource management contexts.

Canons of Construction

Where any term having multiple possible meanings, based on a reasonable interpretation, is set forth in a sentence, clause or other statement (a "statement") in this application, this application should be read as if each such reasonably possible meaning, significance and/or sense of each and every such term and statement is separately, conjunctively and alternatively set forth in additional alternative statement(s) thereafter.

It should also be understood that, for convenience and readability, this application may set forth particular pronouns and other linguistic qualifiers of various specific gender and number, but, where this occurs, this application should be read as if each other gender and number is separately, conjunctively and alternatively set forth in additional alternative statement(s) thereafter.

The embodiments set forth in detail in this application are to ease the reader's understanding of inventions set forth herein and, as such, are only examples of the virtually innumerable alternative embodiments falling within the scope of the application. No specific embodiment set forth in this application should be read as limiting the scope of any claimed inventions; the inventions of the present application are not limited to any particular preferred embodiment disclosed.

These and other aspects of the invention will be made clearer below, in other parts of this application. This Summary, the Abstract, and other parts of the application, are for ease of understanding only, and no part of this application should be read to limit the scope of the invention, whether or not it references matter also set forth in any other part. Further aspects of the invention will be set forth in greater detail, below, with reference to the particular figures.

BRIEF DESCRIPTION OF THE DRAWINGS

The features and advantages of example embodiments of the invention presented herein will become more apparent from the detailed description set forth below when taken in conjunction with the following drawings.

DETAILED DESCRIPTION OF THE INVENTION

Figure 1:
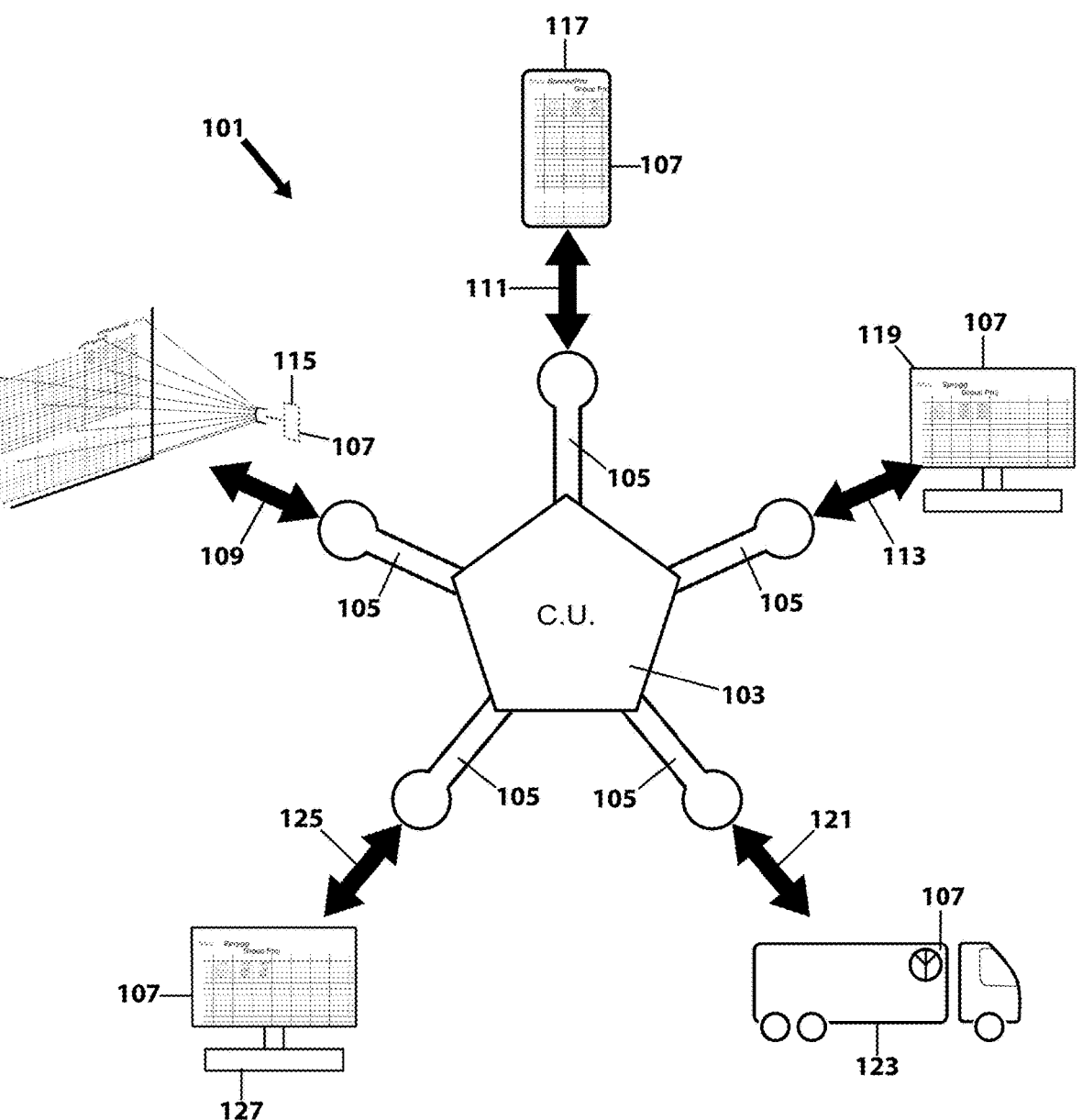
FIG. 1 depicts an example implementation environment for a facilities management system ("FM system"), including, but not limited to, a control system including computer hardware and software, such as the example control system set forth in reference to FIG. 4, below, carrying out example communications control techniques, in accordance with some embodiments of the present application.

The features and advantages of example embodiments of the invention presented herein are directed to new systems, devices and methods for managing diverse communications, and actions related thereto, in management contexts- and, in particular, in facilities management contexts. These and other aspects will become more apparent from the detailed description set forth below when taken in conjunction with the drawings. This description is not intended to limit the application to the embodiments presented herein, which are only examples of the virtually unlimited possible embodiments falling within the scope of the present application. In fact, after reading the following description, it will be apparent to one skilled in the relevant art(s) how to implement the following example embodiments in alternative embodiments, including any possible order, number or other arrangement of components and subcomponents, and in widely varying contexts (the following orders, components, subcomponents, relationships and contexts being non-limiting).

Embodiments of management systems including, but not limited to, a control system including computer hardware and software, carrying out example communications control techniques, and methods for their use in accordance with some aspects set forth in this Specification are depicted in FIGS. 1 through 6. The following is a list of defined components and/or aspects and reference numbers therefor, as used throughout the figures:

| Reference No. | Component |
|---|---|
| 101 | implementation environment |
| 103 | control system |
| 105 | unique, dedicated communications channel(s) |
| 107 | user(s) and/or user devices |
| 109 | communications channel |
| 111 | communications channel |
| 113 | communications channel |
| 115 | facilities manager user/device |
| 117 | facilities manager user/device |
| 119 | facilities manager user/device |
| 121 | vendor communications channel |
| 123 | vendor user/device |
| 125 | client communications channel |
| 127 | vendor user/device |
| 200 | computer hardware system |
| 201 | graphical user interface |
| 203 | control system |
| 204 | wireless antenna |
| 205 | computer monitor |
| 207 | keyboard |
| 209 | mouse |
| 211 | GUI input arrow |
| 213 | individual communications indicating tools |
| 215 | communications indicating tool |
| 217 | phone communications area |
| 219 | communications indicating tool (additional embodiment) |
| 221 | email communications area |
| 300 | FM System |
| 301 | control system |
| 303 | operating system |
| 305 | software applications |
| 306 | software module (main, for FM System 303) |
| 307 | AI operating system and/or instance |
| 309 | virtual machine |
| 311 | separate applications and/or instances of applications |
| 313 | communications and actions management module (of FM system 300) |
| 314 | two-way communications channel |
| 315 | two-way communications channel |
| 317 | two-way communications channel |
| 400 | control system |
| 401 | input/output device |
| 403 | memory device |
| 405 | long-term data storage device |
| 407 | processor(s) |
| 409 | Internet server(s) |
| 411 | local machine(s) |
| 413 | cameras and microphones |
| 414 | sensor(s) |
| 415 | ubiquitous computing devices |
| 417 | application programming interface |
| 418 | scanner |
| 419 | tablet, computer and/or smartphone with application software |
| 500 et seq. | example method steps |
| 601 | implementation environment (alternative embodiment) |
| 603 | control system (alternative embodiment) |
| 604 | variety of users |
| 605 | unique, dedicated communications channel(s) |
| 607 | user(s) and/or user devices |

-continued

| Reference No. | Component |
|---|---|
| 609 | communications channel |
| 611 | communications channel |
| 613 | communications channel |
| 615 | user/device |
| 617 | user/device |
| 619 | user/device |
| 621 | communications channel |
| 623 | user/device |
| 625 | communications channel |
| 627 | user/device |
| 629 | AI agent |
| 631 | facilities manager user |
| 633 | AI agent communications channel |
| 635 | AI agent |
| 637 | facilities vendor user |
| 639 | AI agent communications channel |

FIG. 1 depicts an example implementation environment 101 for a facilities management system ("FM system"), including, but not limited to, a control system 103 including computer hardware and software, carrying out example communications control techniques, in accordance with some embodiments of the present application. Example embodiments of such a control system are provided in reference to FIG. 4, below. In some embodiments, the inventions set forth in this Application are implemented as a comprehensive, all-inclusive control system, managing entire facilities management, maintenance and/or other related processes as an ERP and/or administrative system. Conversely, in some embodiments, the FM system includes a variety of separate, yet intermittently communicatively connected, devices, such as one or more smartphones having a mobile application, in accordance with aspects of the inventions set forth herein) comprised in the control system of the FM system.

And the separate devices and/or FM system may communicate with other systems, such as an external, off-premises FM system and/or an enterprise resource planning system ("ERP"), in various embodiments. Thus, in some embodiments the FM system may communicate with, coordinate and control external systems, having additional control systems and components, as set forth in the present application, in some such embodiments, to manage facilities management being controlled by such external systems.

In any event, as discussed elsewhere in this application, in some embodiments, a control system such as control system 103 includes specialized computer hardware and software, configured to create, assign and manage one or more unique, dedicated communications channel(s) 105 for one or more user(s) and/or user devices 107 of the FM system. For example, in some embodiments, such a communications channel is created, assigned and managed for each facilities manager user and/or user device creating an account on the FM system, such as example communications channels 109, 111 and 113, assigned to facilities manager users/devices 115, 117 and 119, respectively. As another example, in some embodiments, such a communications channel is created, assigned and managed for each vendor user of the FM system, such as example vendor communications channel 121, shown assigned to example vendor user/device 123. As yet another example, in some embodiments, such a communications channel is created, assigned and managed for each FM client user of the FM system, such as example client communications channel 125, shown assigned to example vendor user/device 127. And, in some embodiments, such a communications channel is created for any or all of the above-mentioned users, or other such users, of the FM system.

In some embodiments, at least one of such unique, dedicated communications channels include a unique, dedicated communications address, such as a telephone number. And, in some such embodiments, such a unique, dedicated address is an FM system generated telephone number. As another example, in some embodiments, such a unique, dedicated address is an FM system generated e-mail address (e.g., incorporating a top-level Internet domain owned by the facilities manager). In some embodiments, such a unique address, telephone number and/or communications channel is "dedicated" in the sense that the FM system does not use that address, telephone number and/or communications channel for other user(s) at all, or, in some embodiments, at the same time and/or in the same way. In other words, in some embodiments, such a system-generated, unique address, telephone number and/or communications channel is assigned only to one user (such as a client). However, in some embodiments, such a system-generated, unique address, telephone number and/or communications channel is assigned to a unique project, which may be assigned to a set of facilities managers, project managers, vendors, clients and/or other users and/or stakeholders. And, in some such embodiments, the FM system manages and records some or all communications related to a project (e.g., of a wide variety of communications types, ranging from e-mail to voice and text) by directing such communications through such a system-generated, unique address, telephone number and/or communications channel, as will be discussed further below.

In some embodiments, as will be discussed in greater detail below, such a system-generated, unique address, telephone number and/or communications channel may be "masked," as it is used to mediate communications for such user(s), meaning that at least some users of the FM system may make, receive and manage them, without the FM system indicating, publishing or revealing the identity of the address, telephone number and/or communications channel. Thus, in such embodiments, at least some user(s) remain unaware that such communications are being directed through such a system-generated, unique address, telephone number and/or communications channel (a.k.a. are being "mediated through" such a system-generated, unique address, telephone number and/or communications channel). Instead, in some such embodiments, at least some user(s) may use their account(s) on the FM system to communicate regarding a project, and view and manage any such communications through the FM system application through graphical user interface ("GUI") tools, while the system-generated, unique address, telephone number and/or communications channel remain so masked. However, it should be noted that, in some embodiments, although the unique address, telephone number and/or communications channel remains so masked, if it is known by one or more user(s), it is possible for such one or more user(s) to send communications directly to that unique address, telephone number and/or communications channel without using GUI tools of the FM system, using conventional communications means for such an address, telephone number and/or communications channel. And, if so, such directly sent communications may be managed, recorded and used similarly to other FM system mediated communications, discussed in this application.

In some embodiments, the FM system links a pre-existing communications address (e.g., a phone number), owned by a user, to such a system-generated, unique address, telephone number and/or communications channel, such that, when a communication is sent to such a system-generated, unique address, telephone number and/or communications channel, the FM System will forward at least part of the communication to the pre-existing communications address.

And, in some embodiments, while mediating communications through such a system-generated, unique address, telephone number and/or communications channel, the FM System will ingest and transcribe the communication (e.g., via Application Programming Interface ("API") calls), and take further actions based thereon, as will be discussed in greater detail below. In some such embodiments, such ingestion, transcription and further actions are carried out based on algorithms implemented by the FM system. And, in some such embodiments, may, in turn, data based on such ingestion, transcription and further actions may be stored in different repositories, used to alter such algorithms (e.g., through an AI module including a neural network). Examples of such embodiments will be discussed in greater detail, below.)

Figure 2:
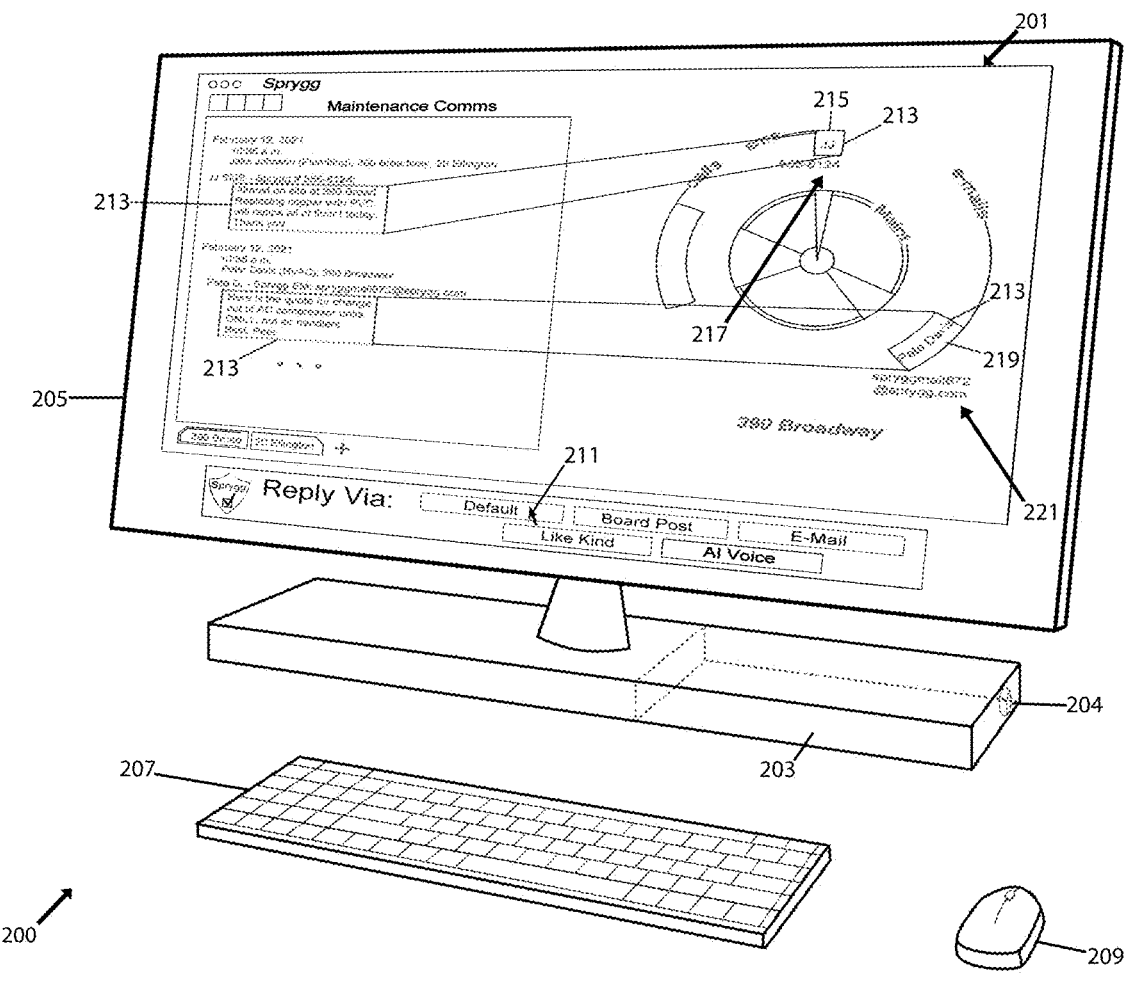
FIG. 2 is a process flow diagram, illustrating several example steps that may be carried out by a control system, such as the example control system set forth in reference to FIG. 4, below, comprised in an FM system, such as any of the FM system embodiments discussed in this application, in accordance with some additional embodiments.

FIG. 2 depicts another exemplary implementation environment, including, but not limited to, an exemplary computer hardware system 200 presenting a graphical user interface ("GUI") 201, carrying out exemplary techniques for managing communications, maintenance and/or other related processes as an FM system, in accordance with aspects of the invention set forth in the present application. In various embodiments, computer hardware system 200 may be comprised in, or may comprise, a control system 203, which may be a control system such as that set forth below in reference to FIG. 4, below, which may or may not be configured for communications with a communications network and/or other, similar control systems (e.g., through wireless antenna 204), as will be discussed in greater detail below. In any event, whether comprising or comprised within such a control system, computer hardware system 200 may be capable of executing any of the techniques for managing communications, maintenance and other related processes as an FM system.

In some embodiments, computer hardware system 200 may comprise user interface tools, such as a display (for example, computer monitor 205) for presenting a GUI (such as GUI 201), and input devices (such as exemplary keyboard 207 and mouse 209, for manipulating an arrow pointer or cursor, such as exemplary GUI input arrow 211). Of course, any number of alternative GUI elements and hardware devices may, instead or in addition to those pictured, be used to carry out the display, input and other operations necessary or helpful for carrying out aspects of the invention set forth in this application. The exact detailed embodiments provided, including the devices and GUI elements set forth in the figures and discussed in detail in this application are, of course, exemplary, and not limiting. Rather, these embodiments are intended only as a reasonable set of possible exemplary structures, substructures, materials, methods, steps and other aspects of the present invention, among virtually infinite and innumerable possibilities for carrying out the present invention, to ease comprehension of the disclosure, as will be readily apparent to those of ordinary skill in the art. For example, the description of one particular order, number or other arrangement of any aspects of the present invention set forth herein is illustrative, not limiting, and all other possible orders, numbers, etc., are also within the scope of the invention, as will be so readily apparent. Any aspect of the invention set forth herein may be included with any other aspect in a particular embodiment, as well as any aspects known in the art, in any number, order, arrangement, or alternative configuration while still carrying out, and falling within, the scope of the invention.

In accordance with methods set forth in greater detail below, a user may communicate with other users through the FM system, in a variety of communication channels and formats, and/or share, download or upload FM related documents and other files. Among other embodiments, such communications and files may be communicated through the computer hardware system 200 by e-mail, file transfer protocol (FTP), text/SMS messaging, voice messaging, virtual bulletin board, project management platforms or communications platforms, or via disk or other media transfer of data.

In some embodiments, example GUI 201 includes GUI tools representing communications, such as example individual communications indicating tools 213, each representing a different historical communication from one or more users of the FM system, as well as the type of communication of each such different historical communication. In some embodiments, one or more of communication indicating tools 213 is organized within GUI 201 based on a communications channel over which the communication takes place. For example, communications indicating tool 215 is shown within a phone communications area 217 of GUI 201 dedicated to, and presenting communications indicating tools for communications carried out over an FM system generated and assigned telephone number, in accordance with some embodiments set forth in this application. As another example, communications indicating tool 219 is shown within an email communications area 221 of GUI 201 dedicated to, and presenting communications indicating tools for communications carried out over an FM system generated and assigned email address, in accordance with some additional embodiments set forth in this application. And, as discussed above, in some embodiments, each such communications channel may be assigned to one or more users, projects, tasks, or types of tasks, within a project, which may also be identified within or about such communications indicating tools, in various embodiments.

Figure 3:
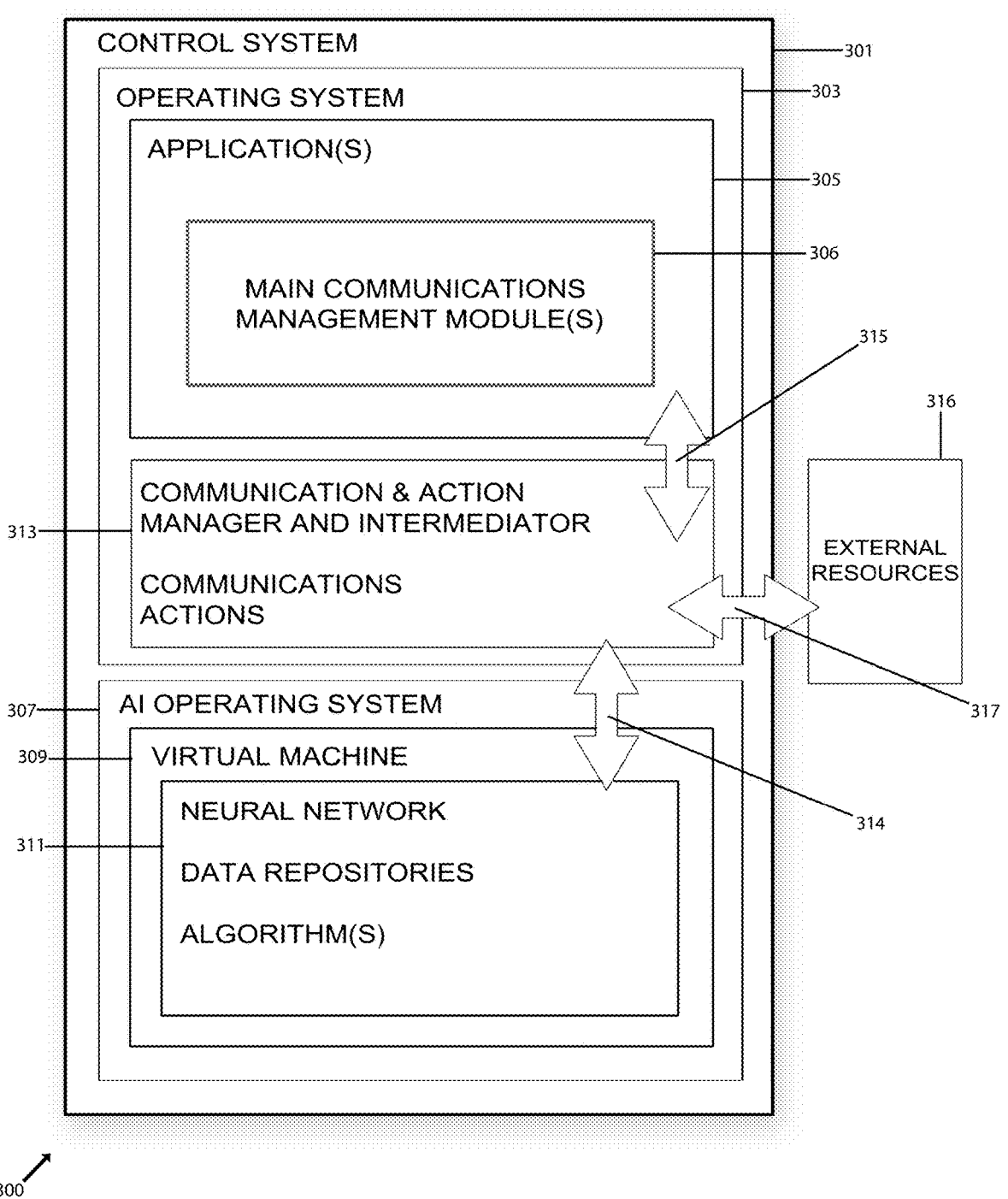
FIG. 3 is a diagram of example major system components and modules of an example FM system, which may comprise, or be comprised within, a control system and/or computer hardware, such as the control system set forth in reference to FIG. 4, below, in accordance with aspects of the present invention.

FIG. 3 is a diagram of example major system components and modules of an example FM system 300, which may comprise, or be comprised within, a control system and/or computer hardware, such as the control system set forth in reference to FIG. 4, below, in accordance with aspects of the present invention. Among other things, example FM system 300 may comprise (or be comprised within), but is not limited to, any number of computer hardware devices programmed with example software or otherwise configured to carry out aspects of the present invention set forth in the present application-including, but not limited to the example control systems, networks and computer hardware and software set forth in this application. A number of example implementations of the present invention may be carried out within the framework of FM system 300, as will be discussed in greater detail, below.

FM system 300 comprises an example implementation of techniques for managing communications, maintenance and/or other related processes as an FM system, in accordance with aspects of the invention set forth in the present application. In some embodiments of such an implementation, FM system 300 may comprise a control system 301, which itself may comprise, or be comprised within, computer hardware (such as the computer hardware system 200, discussed above, or another such client device). As also discussed above, such computer hardware may comprise a number of input and output devices, and a GUI, designed and created with computer software, configuring the computer hardware for a user to carry out any aspect of the present invention set forth in the present application, such as managing a wide variety of communications through the computer hardware system and/or control system, or any of the other steps set forth in the present application (for example, in FIG. 5, below). Control system 301 may comprise an operating system 303, which manages control system 301 resources, and acts as an intermediary between the control system 301 and software applications 305, which may include communications and document management software application features and modules, such as example communications management module(s) 306, in some embodiments. Such software applications and communications and document management features and other computer software aspects, thus may run on the control system 301, and are managed by the operating system 303, and may manage communications and, the creation of communications channels, using such applications, carrying out any communications creation and management functions known in the art.

In some embodiments, the control system 301 also may comprise an artificial intelligence component(s), which may be provided within a segregated hardware subsystem (e.g., AI operating system and/or instance 307 hosting a virtual machine 309) with separate addressing and/or otherwise confined and protected resources, in which particular neural networks may be developed and trained on data repositories to generate algorithms for the management of communications, as discussed in greater detail elsewhere in this application. In some embodiments, AI operating system 307 and virtual machine 309, or instances thereof, may run on a separate system space, with separate file and resource addressing, or otherwise may be segregated from operating system 303, managing separate applications and/or instances of applications 311 (such as those discussed in greater detail elsewhere in this application), e.g., configured for generating algorithms for managing different types of communications and FM system tasks, in accordance with aspects of the present invention.

To facilitate managing communications while running AI modules and generating AI algorithms, FM system 300 also may comprise an FM system communications and actions management module 313, in some embodiments. In some such embodiments, communications and actions management module 313 may be run within operating system 303, within AI operating system or instance 307, and/or, in some embodiments, within both operating systems or instances 303 and 307, or a third operating system. As discussed in greater detail below, communications and actions management module 313 may manage and pass specialized communications objects, such as commands and/or requests for information and other resources, both from and between virtual machine 307 and operating system 303, and external resources 316, which may include external data repositories, in some embodiments, across communications channels, such as the example two-way communications channels shown as two-way communications channel 314, two-way communications channel 315 and two-way communications channel 317.

Figure 4:
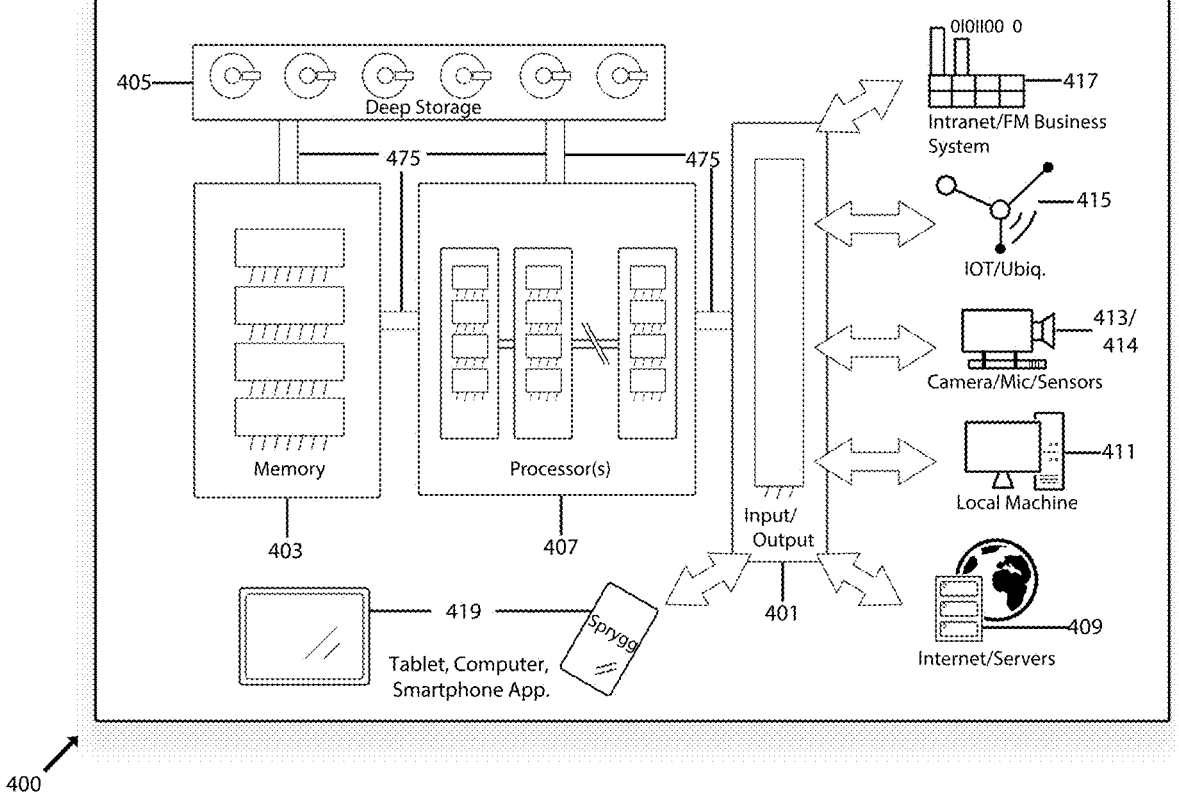
FIG. 4 is a schematic block diagram of some elements of a control system in accordance with some example embodiments of the invention.

FIG. 4 is a schematic block diagram of some elements of a control system 400 in accordance with an example embodiment of the present invention. In some example embodiments, control system 400 incorporates a non-transitory machine-readable medium storing instructions, that, when executed by one or more processors, execute various aspects of the present invention described herein. The generic and other components and aspects described herein are not exhaustive of the many different systems and variations, including a number of possible hardware aspects that might be used, in accordance with the example embodiments of the invention. Rather, the control system 400 is an exemplary embodiment.

Control system 400 includes an input/output device 401, a memory device 403, long-term data storage device 405, and processor(s) 407. The processor(s) 407 is (are) capable of receiving, interpreting, processing and manipulating signals and executing instructions for further processing and for output, pre-output and/or storage in and outside of the system. The processor(s) 407 may be general or multipurpose, single- or multi-threaded, and may have a single core or several processor cores, including microprocessors. Among other things, the processor is capable of processing signals and instructions for the input/output device 401, to cause a user interface to be provided or modified for use by a user on hardware, such as, but not limited to, physical hand-operated controls (e.g., on a handheld or other portable device, such as tablet or smartphone 419 running specialized computer software to manage diverse forms and instances of communications related to projects) and/or a personal computer monitor or terminal monitor with a mouse and keyboard and presentation and input-facilitating software (as in a graphical user interface, a.k.a. a "GUI") (e.g., on local machine(s) 411).

For example, user interface aspects, such as graphical "windows," "buttons" and data entry fields, may present via, for example, a display, a selectable option. When the option is selected, such selection causes aspects of the control system to command other aspects of the control system to manage communications, issue AI-generated communications, create dedicated communications channels, and otherwise create and facilitate communications by an FM system (e.g., via the Internet and/or telecommunications infrastructure). For example, and as explained in greater detail elsewhere, the control system 400 may create unique communications channels for individual users and projects, and ingest and transcribe those communications, extract data, and create data repositories connected with the control system 400, to manage communications related to one or more FM project(s). As another example, and also as explained elsewhere in this application, the control system may include a neural network, trained on data held within such data repositories, and create unique algorithms for classifying and organizing new communications managed by the system, and for taking further actions based thereon.

The processor(s) 407 may execute instructions stored in memory device 403 and/or long-term data storage device 405, and may communicate via system bus (ses) 475. Input/output device 401 is capable of input/output operations for the system, and may include and communicate through input and/or output hardware, and instances thereof, such as a computer mouse, scanning device or other sensors, actuator(s), communications antenna (ac), keyboard(s), smartphone(s) and/or PDA(s), networked or connected additional computer(s), camera(s) or microphone(s), a mixing board(s), real-to-real tape recorder(s), external hard disk recorder(s), additional movie and/or sound editing system(s) or gear, speaker(s), external filter(s), amp(s), preamp(s), equalizer(s), computer display screen(s) or touch screen(s). Such input/output hardware could implement a program or user interface created, in part, by software, permitting the system and user to carry out the user settings and input discussed in this application. Input/output device 401, memory device 403, data storage device 405, and processor (s) 407 are connected and able to send and receive communications, transmissions and instructions via system bus (ses) 475. Data storage device 405 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. Also generally speaking, the system may be implemented as middleware, whereby it provides output and other services to an external system, including, but not limited to, any of the example devices and auxiliary devices and/or systems, shown as internet server(s) and blockchain (s) 409, local machine(s) 411, cameras and microphones 413, sensor(s) 414, internet of things or other ubiquitous computing devices 415, Intranet and/or FM business system 417, and tablet or smartphone 419. Similarly, the control system 400 is capable of accepting input from any of those auxiliary devices and systems, and modifying stored data within them and within itself, based on any input or output sent through input/output device 401.

Input and output devices may deliver their input and receive output by any known means, including, but not limited to, any of the hardware and/or software examples shown as internet server(s) and blockchain(s) 409, local machine(s) 411, cameras and microphones 413, sensor(s) 414, internet of things or other ubiquitous computing devices 415, Intranet and/or FM business system 417, and tablet or smartphone 419.

While the illustrated example of a control system 400 in accordance with the present invention may be helpful to understand the implementation of aspects of the invention, any suitable form of computer system known in the art may be used—for example, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN or the many connections forming the Internet. The system can be embodied in a tangibly-stored computer program, as by a machine-readable medium and propagated signal, for execution by a programmable processor. The many possible method steps of the example embodiments presented herein may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 5:
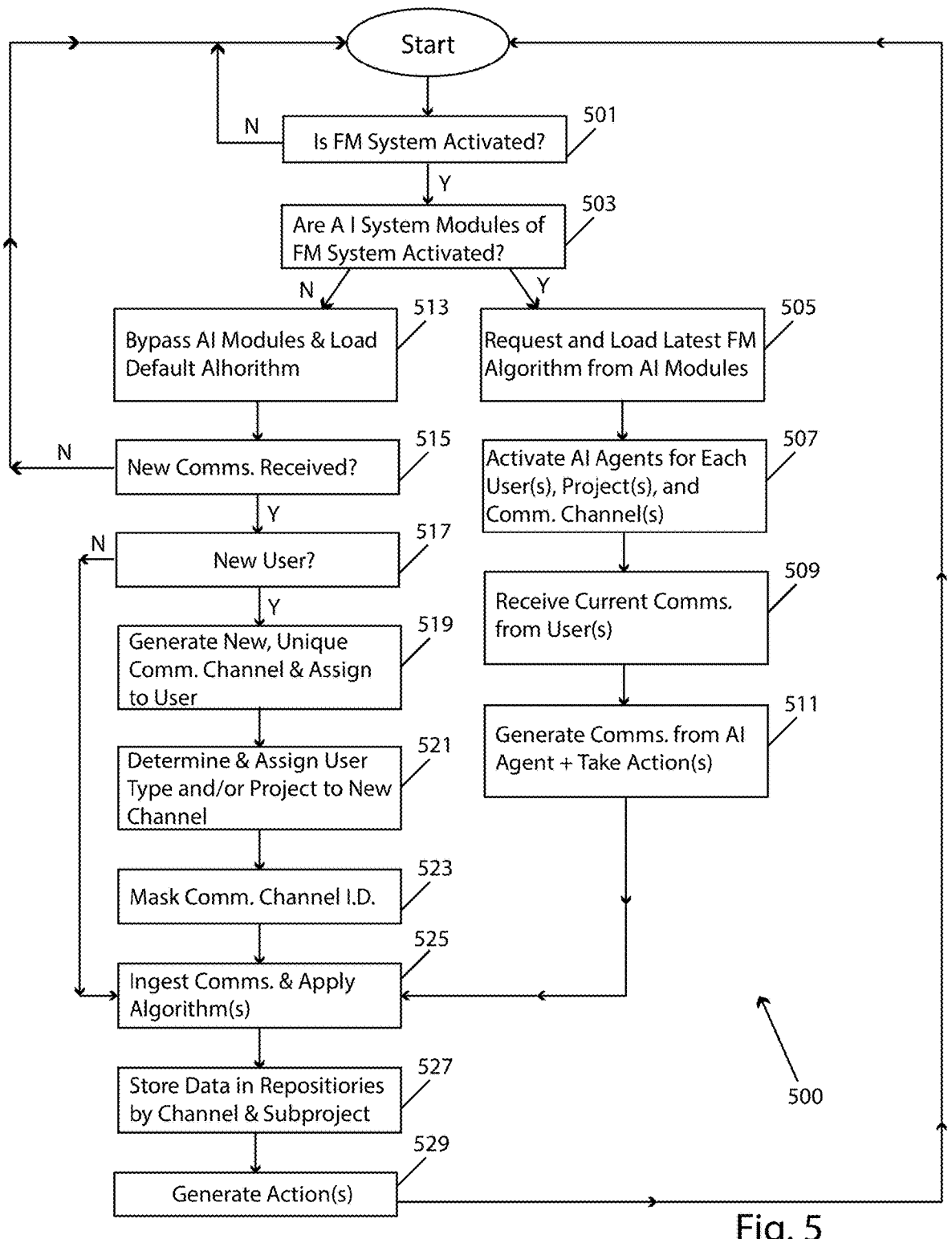
FIG. 5 is a process flow diagram, illustrating several example steps that may be carried out by a control system, such as the example control system set forth in reference to FIG. 4, in accordance with some additional embodiments.

FIG. 5 is an example process flow diagram, illustrating some example steps 500 that may be undertaken by a control system, such as the example control system provided in reference to FIG. 4, above, including and/or included within an FM system, in accordance with some example embodiments of the present invention.

Beginning with step 501, in some embodiments, the control system may first determine whether it is functioning and on-line (a.k.a. "activated"), meaning that it is receiving adequate power, and has adequate resources to carry out additional process steps of an FM system, such as the example steps set forth below. If so, the control system may proceed to step 503, in some embodiments, in which it determines whether AI modules of the FM system, such as any of the AI modules for FM systems set forth in this application, are activated, meaning that the AI modules are receiving adequate power, and have adequate resources to carry out additional process steps of AI modules of an FM system, as set forth herein. If so, in some embodiments, the control system proceeds to step 505, in which it loads a latest available, updated FM algorithm generated and produced by the activated AI modules. In some embodiments, the FM system also then proceeds to step 507, in which it proceeds to activate AI agent submodules of the AI modules, which are each configured to generate a unique, specialized verbal colloquy with one or more user(s), type(s) of users, or group(s) of users related to a particular project or type of project, and/or carried out over a particular communications channel, of the FM system, in various embodiments. And in some embodiments, as discussed above, such AI agent submodules may also be configured to generate one or more unique action(s) related to one or more user(s), type(s) of users, or group(s) of users related to a particular project or type of project, of the FM system. To aid in carrying out such a colloquy, and/or such action(s), in some embodiments, the control system proceeds to step 509, in which it receives one or more current communications from the one or more user(s). The AI agent submodule may then proceed to generate communications over one or more communications channel(s) to the one or more user(s), in some embodiments, and/or to other user(s) related to a project and/or communications channel, in some such embodiments, in step 511. The control system may then proceed to steps 525 et seq., related to FM system process steps that do not require active AI submodules, in some embodiments, which steps will be discussed in greater detail below, in some embodiments.

Returning to step 503, if the control system determines that AI sub-modules of the FM system are not, in fact, activated, in some embodiments, the control system next proceeds to step 513, in which it bypasses interfacing, communicating with or otherwise using the AI sub-modules modules—for example, by activating programming for carrying out steps not requiring the activation of such AI sub-modules, which may include implementing one or more static (default) algorithm(s), which do not depend upon live updates from active AI submodules, and/or if/then programming commands and statements to carry out such steps, as will be discussed in greater detail, below. Beginning with step 515, for example, in some such embodiments, the control system next determines whether one or more new communication(s) have been carried out over the FM system. If not, the control system may return to the starting position. If so, however, the control system may next proceed to step 517, in which it determines whether the immediately aforementioned new communication(s) originate from a new user of the FM system (e.g., a new user calling into a main phone number of an FM system). If not, the control system may next proceed to steps 525 et seq. in some embodiments. If so, however, the control system may, in some embodiments, generate a new, unique communications channel, and assign it to the new user, in step 519. In some embodiments, users may access the FM system application to communicate regarding the project in any number of different communications formats. For example, in some embodiments, users may manipulate GUI tools of the FM system to manage and engage in voice messaging, e-mail, live voice calls, video meetings, text messaging, data transmissions, and/or a virtual bulletin board, and view and manage any and all such communications through the FM system application through such GUI tools, while the communications channel and/or telephone number remain masked, as discussed above. And, as discussed elsewhere in this application, in some embodiments, the FM system manages and records some or all communications related to a project by directing such communications through such a system-generated, unique address, telephone number and/or communications channel.

The control system also may proceed to step 521, in some embodiments, in which it assigns a user type and/or a project related to the new, unique communications channel, in some such embodiments, based on key words present in the new communication(s), and whether those key words relate to such a user type and/or project. In any event, the control system, in some embodiments, may mask the new, unique communications channel and/or a unique identifier thereof (such as a telephone number generated by the FM system) of the new, unique communications channel, in some embodiments, as such masking is discussed elsewhere in this application, in step 523. For example, in some embodiments, such a new, unique communications channel and/or identifier is masked in the sense that at least some users of the FM system may make, receive and manage communications through it, without the FM system indicating, publishing or revealing the identity of the communications channel. Thus, in such embodiments, at least some user(s) remain unaware that communications are being directed through such a system-generated, unique communications channel (a.k.a. communications are being "mediated through" such a system-generated, unique address, telephone number and/or communications channel). In some embodiments, any new user contacting another user of the FM system through such a system-generated, unique address, telephone number and/or communications channel may be instantaneously assigned another new unique address, telephone number and/or communications channel generated by the FM System, which, in some embodiments, may be masked, or, conversely, used to mask the new user's pre-existing telephone number or other identifier used in contacting the FM system. In some such embodiments, the FM system not only generates, but also instantaneously publishes such a telephone number and/or other identifier of the new system-generated, unique address, telephone number and/or communications channel to other users (e.g., to the other user contacted by the new user).

Regardless of whether a new user was determined to exist, in step 517, and even if AI sub-modules were determined to be activated, in steps 503 et seq., the control system ultimately proceeds to step 525, in which it ingests communications carried out over one or more communications channels managed by the FM system, meaning that it will record and analyze language, commands and other features of the communications, for example, by applying an AI-generated (e.g., LLM) or static algorithm to that language. In some embodiments, all or part of such communications may be transcribed (e.g., in the instance of voice communications, using voice-to-text software included within the control system), and key words, data and other features of the transcript may be recorded by the control system. And, in some embodiments, the control system records such transcripts, data and features in data repositories of the control system in step 527 (e.g., in some such embodiments, creating multiple repositories organized by the type of data stored therein, such as data determined to be related to a particular user(s), channel(s) project(s) and/or subject matter). In some embodiments, such determinations are aided, at least in part, by the initial key words (e.g., in a new user's initial communications with the aid of the FM system) used to assign the user type and/or project, as discussed above.

In some embodiments, users may carry out actions on the FM system based on those communication(s) carried out through the FM system, in subsequent step 529. In some such embodiments, such actions may be generated, or appear to be generated, by an AI agent sub-module of the control system (e.g., by the AI agent communicating with one or more user(s) indicating that it has generated the action). A wide variety of communications may be mediated by a communications channel in accordance with aspects set forth in this application—for example, SMS, voice messages, and/or e-mail, which generate such actions (which communications may be referred to in this application as "message commands"). In some embodiments, such a message command may be made in any format, or even using natural language (which may be referred to as "freeform message commands" in this application). However, in some embodiments, at least some syntax or other formal prerequisites must be carried out within message commands for the FM system to take such actions—e.g., in some such embodiments, a user must include details of a record and/or object stored on the FM system (such as a work order, location, client name, or other unique identifier) as a prerequisite for the FM system to perform such actions with respect to such a record and/or object (e.g., updating a vendor work order for an FM project). For example, in some embodiments, to initiate such an action, a user may enter a text using a GUI of the FM system stating identifying a work order by its type and an auxiliary identifier, such as "[work order type] latest plumbing task, 2314 Cantor Avenue," followed by a stated command such as the text "mark paid" or "complete." Although, in some embodiments, the structure of such auxiliary identifiers may be omitted, where the context (e.g., the communications are being carried out over a communications channel dedicated to the real estate property identified by the street address above) indicates to the AI agent and FM system that the command relates to that identified address.

The control system may then return to the starting position, in some embodiments.

Figure 6:
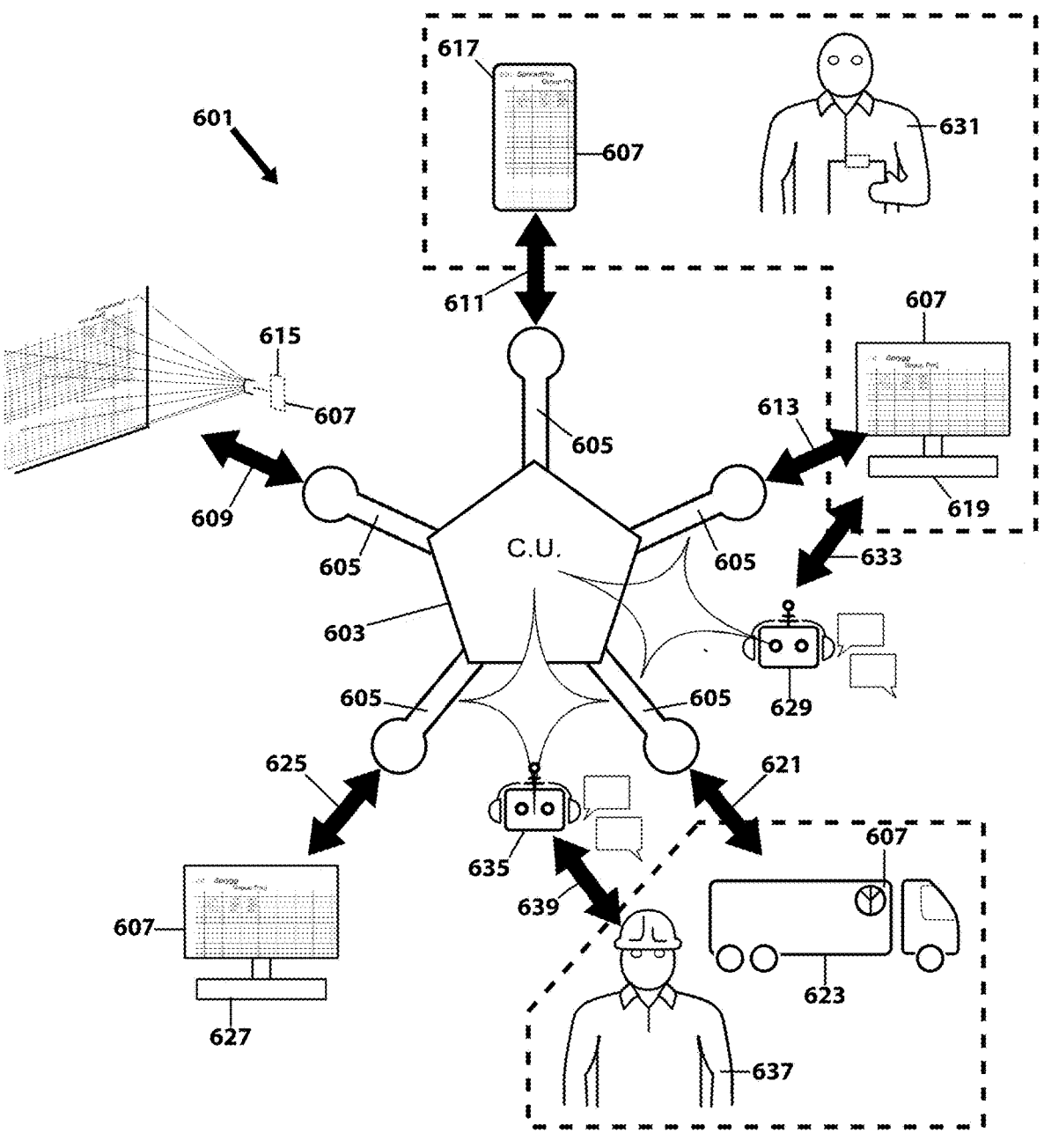
FIG. 6 depicts another example implementation environment for an FM system, including, but not limited to, a control system including computer hardware and software, carrying out example communications control techniques with a variety of users and stakeholders, in accordance with some embodiments of the present application.

FIG. 6 depicts another example implementation environment 601 for an FM system, including, but not limited to, a control system 603 including computer hardware and software, carrying out example communications control techniques with a variety of users 604 and/or stakeholders, in accordance with some embodiments of the present application. As with other FM systems discussed in this application, example embodiments of such a control system are provided in reference to FIG. 4, above. And, also as with other FM systems set forth in this application, the separate devices and/or the control system may communicate with other systems, such as an external, off-premises FM system and/or an enterprise resource planning system ("ERP"), in various embodiments. Thus, in some embodiments such an FM system may communicate with, coordinate and control external systems, having additional control systems and components, as set forth in the present application, in some such embodiments, to manage facilities management ("FM") being controlled by such external systems.

In any event, as discussed elsewhere in this application, in some embodiments, a control system such as control system 603 includes specialized computer hardware and software, configured to create, assign and manage one or more unique, dedicated communications channel(s) 605 for one or more user(s) and/or user devices 607 of the FM system. For example, in some embodiments, such a communications channel is created, assigned and managed for each user device creating an account on the FM system, such as example communications channels 609, 611, 613, 621 and 625, assigned to users/devices 615, 617, 619, 623 and 627, respectively. And, in some embodiments, such a communications channel is created for any or all of the above-mentioned users, or other such users, of the FM system.

In some embodiments, at least one of such unique, dedicated communications channels include a unique, dedicated communications address and/or identifier ("ID"), such as a telephone number. And, in some such embodiments, such a unique, dedicated address is an FM system generated telephone number. As another example, in some embodiments, such a unique, dedicated address is an FM system generated e-mail address (e.g., incorporating a top-level Internet domain owned by the facilities manager). In some embodiments, such a unique address, telephone number and/or communications channel is "dedicated" in the sense that the FM system does not use that address, telephone number and/or communications channel for other user(s) at all, or, in some embodiments, at the same time and/or in the same way. In other words, in some embodiments, such a system-generated, unique address, telephone number and/or communications channel is assigned only to one user (such as a client). However, in some embodiments, such a system-generated, unique address, telephone number and/or communications channel is assigned to a unique project, which may be assigned to a set of facilities managers, project managers, vendors, clients and/or other users and/or stakeholders. And, in some such embodiments, the FM system manages and records some or all communications related to a project (e.g., of a wide variety of communications types, ranging from e-mail to voice and text) by directing such communications through such a system-generated, unique address, telephone number and/or communications channel, as will be discussed further below.

In some embodiments, discussed in greater detail above, such a system-generated, unique address, telephone number and/or communications channel may be "masked," as it is used to mediate communications for such user(s), meaning that at least some users of the FM system may make, receive and manage them, without the FM system indicating, publishing or revealing the identity of the address, telephone number and/or communications channel. Thus, in such embodiments, at least some user(s) remain unaware that such communications are being directed through such a system-generated, unique address, telephone number and/or communications channel (a.k.a. are being "mediated through" such a system-generated, unique address, telephone number and/or communications channel). Instead, in some such embodiments, at least some user(s) may use their account(s) on the FM system to communicate regarding a project, and view and manage any such communications through the FM system application through graphical user interface ("GUI") tools, while the system-generated, unique address, telephone number and/or communications channel remain so masked. However, it should be noted that, in some embodiments, although the unique address, telephone number and/or communications channel remains so masked, if it is known by one or more user(s), it is possible for such one or more user(s) to send communications directly to that unique address, telephone number and/or communications channel without using GUI tools of the FM system, using conventional communications means for such an address, telephone number and/or communications channel. And, if so, such directly sent communications may be managed, recorded and used similarly to other FM system mediated communications, discussed in this application.

In some embodiments, the FM system links a pre-existing communications address (e.g., a phone number), owned by a user, to such a system-generated, unique address, telephone number and/or communications channel, such that, when a communication is sent to such a system-generated, unique address, telephone number and/or communications channel, the FM System will forward at least part of the communication to the pre-existing communications address.

And, in some embodiments, while mediating communications through such a system-generated, unique address, telephone number and/or communications channel, the FM System will ingest and transcribe the communication (e.g., via Application Programming Interface ("API") calls), and take further actions based thereon, as will be discussed in greater detail below. In some such embodiments, such ingestion, transcription and further actions are carried out based on algorithms implemented by the FM system. And, in some such embodiments, may, in turn, data based on such ingestion, transcription and further actions may be stored in different repositories, used to alter such algorithms (e.g., through an AI module including a neural network). Examples of such embodiments will be discussed in greater detail, below.)

As also mentioned above, in some embodiments, one or more AI agents may be created and/or activated to communicate with particular user(s), user type(s), and/or on particular communications channel(s). For example, in some embodiments, such an AI agent (e.g., example AI agent 629) may be created and activated to conduct communications with one or more facilities manager user(s), such as example facilities manager user 631. In some such embodiments, AI agent 629 may respond and take actions related to any communications carried out by facilities manager user 631 and/or, in some embodiments, any communications carried out over a communications channel designated for the AI agent (such as example AI agent communications channel 633) and/or the facilities manager user 631 (such as example communications channel 613).

Similarly, and as another example, in some embodiments, such an AI agent (e.g., example AI agent 635) may be created and activated to conduct communications with one or more facilities vendor user(s), such as example facilities vendor user 637. In some such embodiments, AI agent 635 may respond and take actions related to any communications carried out by facilities vendor user 637 and/or, in some embodiments, any communications carried out over a communications channel designated for the AI agent (such as example AI agent communications channel 639) and/or the facilities vendor user 637 (such as example communications channel 621).

A wide variety of alternative and/or additional users and user types, including, but not limited to, real estate operator users, may also be included, in various embodiments of FM systems in accordance with aspects of the inventions set forth in the present application. Similarly, a wide variety of alternative and/or additional AI agents and AI agent types may also be created and included, along with additional unique communications channels, in addition to the examples provided above. For example, in some embodiments, an additional, unique AI agent and AI agent communications channel may be created for each user of the control system. As another example, in some embodiments, an additional, unique AI agent and AI agent communications channel may be created for each type of user of the control system. However, in some embodiments, one or more AI agents is used across user(s) and/or user type(s).

As discussed above, in some embodiments, actions are taken by the control system and/or an AI sub-module of the control system, based on communications and data ingested by the control system. And, as also discussed above, some of these actions may be, or may be represented to a user as, originating from one of more such AI agents. Such actions may vary by AI agent, and the project, type of project, user, or type of user, subject to communications with the AI agent. For example, in some embodiments, the AI agents undertake any or all of the following actions: A. work order management actions (for any of the above-discussed user types); B. service appointment scheduling (for any of the above-discussed user types); C. Field service technical assistance actions (e.g., for FM vendor users); D. work order prioritization assignment (e.g., for real estate operator or FM vendor users); E. route optimization planning (e.g., for FM vendor users); F. data analysis and reporting actions (e.g., for real estate operator users or FM users); G. executing vendor payments (e.g., for real estate operator or FM vendor users); H. lease tracking and analysis (e.g., determining maintenance responsibility) (e.g., for real estate operator users or FM users); and/or I. insurance policy analysis and tracking (e.g., for real estate operator users). And, as discussed above, in some embodiments, one or more users may initiate any such actions, with respect to particular real estate properties, projects, vendors or other subject matter, based on freeform message commands (e.g., implemented by voice or text messages over a unique, dedicated communications channel for that subject matter). In some embodiments, by communicating over a particular unique, dedicated communications channel and/or with an AI agent dedicated to such a subject matter, such commands may be executed without the need for auxiliary identifiers, as discussed above, because the FM system identifies the command as related to that subject matter by utilization of that communications channel or agent.

It should be understood that the above-described components, steps, and number and order of components and steps for the example fire-containing furniture discussed in this application, is only exemplary of certain embodiments set forth in this application, which are not intended to limit the application in any way. In fact, virtually unlimited alternative orders, numbers and instances of the above steps and components, in addition with countless additional and alternative steps, may be used and/or performed, within the scope of the present application and inventions herein, as will be readily apparent to those of skill in the art. Although the example of a metal table has been provided, it should be understood that any suitable alternative form of furniture and components may be used, instead of, or in addition to, such a table, in various embodiments, while carrying out aspects of the present inventions, as will be readily apparent to those of skill in the art.

What is claimed is:

1. A facilities management system (FM system), comprising:

a control system, comprising:

specialized computer software;

communications hardware, comprising at least one network connection;

a unique communications channel generator, configured to generate and assign a plurality of unique communications channels dedicated to one or more users of the FM system allowing the one or more users to communicate with a plurality of other users of the FM system; and a communications management module, comprising a data repository generator, configured to generate a plurality of data repositories each being for a different type of data present in communications carried out over one or more of the plurality of unique communications channels for one or more users of the facilities management system;

wherein the communications management module includes an artificial intelligence module generating and summarizing one or more transcripts of said communications, defining said different types of data present in communications, and recording derived data from said communications into one or more of said plurality of data repositories based on the derived data's type; and wherein the unique communications channel generator generates a new unique communications channel for a user and/or subject matter based on a first set of key words present in initial communications from a new user.

2. The facilities management system of claim 1, wherein the FM system transcribes and stores data related to all communications carried out over the new unique communications channel.

3. A facilities management system (FM system), comprising:

a control system, comprising:

specialized computer software;

communications hardware, comprising at least one network connection;

a unique communications channel generator, configured to generate and assign a plurality of unique communications channels dedicated to one or more users of the FM system allowing the one or more users to communicate with a plurality of other users of the FM system; and a communications management module, comprising a data repository generator, configured to generate a plurality of data repositories each being for a different type of data present in communications carried out over one or more of the plurality of unique communications channels for one or more users of the facilities management system;

wherein the communications management module includes an artificial intelligence module generating and summarizing one or more transcripts of said communications, defining said different types of data present in said communications, and recording derived data from said communications into one or more of said plurality of data repositories based on the derived data's type; and wherein the control system links at least one of the plurality of unique communications channels to at least one communications address(es) owned by a user prior to creation of the at least one of the plurality of unique communications channels, and forwards at least some of said communications to the at least one communications address(es) owned by said user.

4. The facilities management system of claim 3, wherein the control system creates at least one other, consolidated communications channel(s), including a GUI including one or more GUI tools for viewing and managing said communications over said at least one of the plurality of unique communications channels and said at least one communications address(es) owned by said user.

5. The facilities management system of claim 3, wherein at least one of the plurality of unique communications channels comprises a unique, dedicated telephone number.

6. The facilities management system of claim 3, wherein each of the plurality of unique communications channels comprises a unique, dedicated telephone number.

7. The facilities management system of claim 3, wherein at least one of the plurality of unique communications channels is masked from at least one user.

8. The facilities management system of claim 5, wherein the unique, dedicated telephone number is masked from at least one user.

9. The facilities management system of claim 6, wherein each of the unique, dedicated telephone numbers is masked from at least one user.

10. The facilities management system of claim 3, wherein the artificial intelligence module generates an algorithm for labeling said data present in said communications.

11. The facilities management system of claim 10, wherein said storing of said data within said repositories is based on said labeling of said data present in said communications.

12. The facilities management system of claim 5, wherein the system generates a second unique, dedicated telephone number for a newly-joining user of the system, wherein said second unique, dedicated telephone number is published to at least one other user of the system.

13. The facilities management system of claim 5, wherein the unique communications channel generator generates a unique communications channel for a user and/or subject matter based on a first set of key words present in initial communications from a new user.

14. The facilities management system of claim 13, wherein the unique communications channel for a user and/or subject matter is generated based on an additional set of key words present in initial communication(s) from said new user.

15. The facilities management system of claim 13, wherein the new unique communications channel for a user and/or subject matter is masked.

16. The facilities management system of claim 3, wherein the FM system transcribes and stores data related to all communications carried out over the new unique communications channel.

17. The facilities management system of claim 3, wherein the communications management module interprets freeform message commands based, in part, on said subject matter.

18. The facilities management system of claim 3, wherein the communications management module includes a second artificial intelligence module, configured to take autonomous actions with respect to a facilities management project being managed by the control system.

19. The facilities management system of claim 18, wherein:

said communications carried out over one or more of the plurality of unique communications channels comprises a freeform communication by a user; and the communications management module carries out at least one of said autonomous actions with respect to a record and/or object recorded into said one or more of said plurality of data repositories based on said freeform communication by a user.

20. The facilities management system of claim 18, wherein the second artificial intelligence module, configured to take autonomous actions with respect to a facilities management project being managed by the control system, comprises a chatbot and caries on project management steps.

\* \* \* \* \*